R. A. REYNOLDS.
INTERNAL COMBUSTION ENGINE.
APPLICATION FILED MAR. 11, 1909.

924,382.

Patented June 8, 1909.
2 SHEETS—SHEET 1.

Witnesses
C. E. Day
Alice Townsend

Inventor
Robert A Reynolds
Parker W Burton
By
Attorneys

R. A. REYNOLDS.
INTERNAL COMBUSTION ENGINE.
APPLICATION FILED MAR. 11, 1909.

924,382.

Patented June 8, 1909.
2 SHEETS—SHEET 2.

Witnesses
C. E. Day.
Alice Townsend.

Inventor
Robert A. Reynolds
By Parker Burton
Attorneys

UNITED STATES PATENT OFFICE.

ROBERT A. REYNOLDS, OF DETROIT, MICHIGAN, ASSIGNOR TO REYNOLDS GAS ENGINE CO.

INTERNAL-COMBUSTION ENGINE.

No. 924,382.    Specification of Letters Patent.    Patented June 8, 1909.

Application filed March 11, 1909. Serial No. 482,834.

*To all whom it may concern:*

Be it known that I, ROBERT A. REYNOLDS, a citizen of the United States, residing at Detroit, county of Wayne, State of Michigan, have invented a certain new and useful Improvement in Internal-Combustion Engines, and declare the following to be a full, clear, and exact description of the same, such as will enable others skilled in the art to which it pertains to make and use the same, reference being had to the accompanying drawings, which form a part of this specification.

This invention relates to internal combustion engines; it has for its object an improved rotary valve for internal combustion engines, which may be considered either as an oil packed valve, or as an air packed valve, or as a valve which is balanced by the peculiar character and application of the packing employed.

Figures 1, 2, 3:
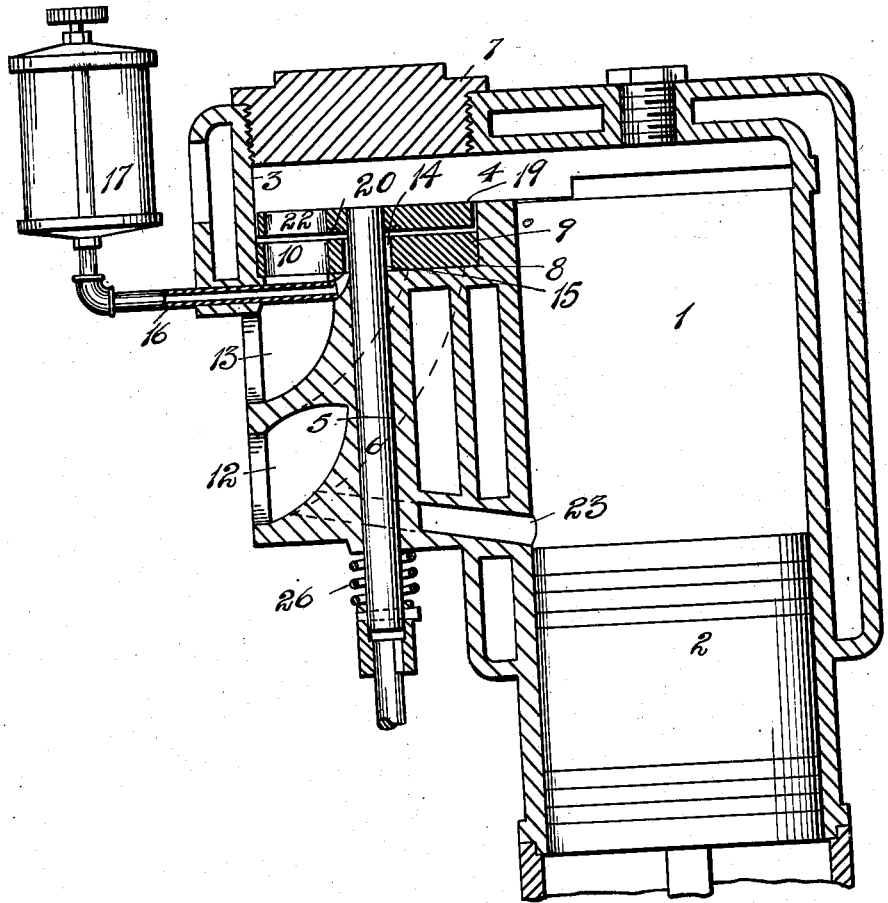
Figure 4:
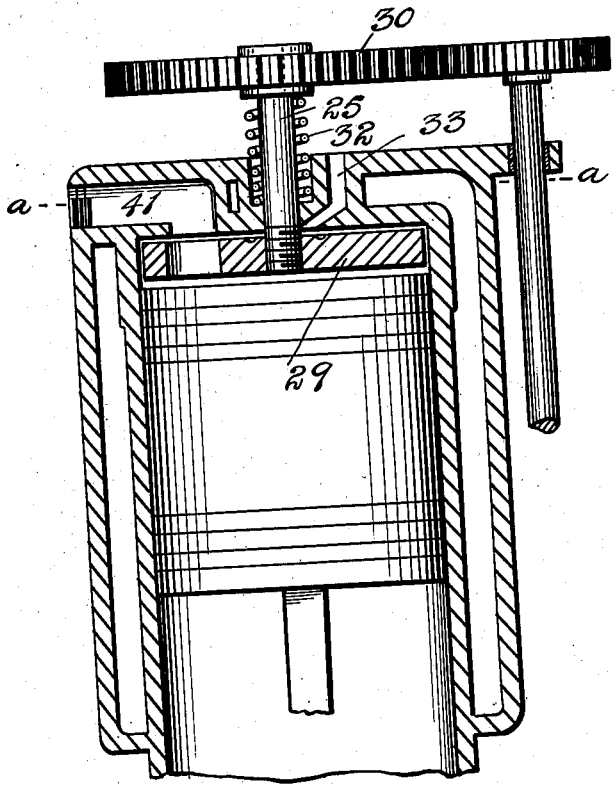
Figure 5:
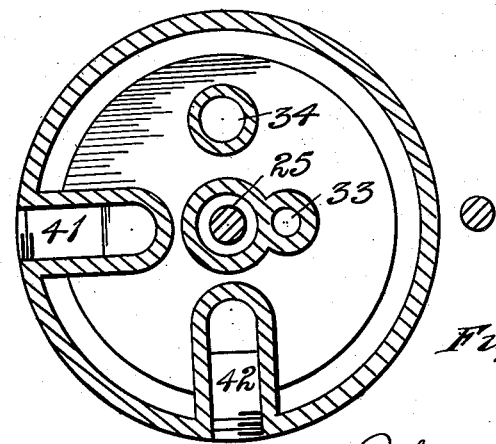

In the drawings:—Figure 1, is a sectional elevation of the cylinder, the valve case, and the appurtenances to the valve case. Fig. 2, is a bottom view of the valve. Fig. 3, is a plan view of the valve seat employed. Fig. 4, is a sectional elevation of a cylinder with valve arranged directly in the end thereof. Fig. 5, is a cross section at *a—a* of Fig. 4.

1 indicates the cylinder, 2 the piston, and 3 indicates the valve casing, preferably cast integral with, and as a part of, the cylinder structure. The chamber within the valve casing communicates with the chamber within the cylinder, through a passage 4 that leads into the cylinder near the closed end thereof. The valve casing is provided with a long stem-bearing portion 5, bored for the valve stem 6. That part of the casing which lies next adjacent to the closed ends of the cylinder is provided with a large cylindrical chamber bored and machined from without, and closed by the screw plug 7. The face 8 of this chamber forms the sub-seat for a removable seat piece 9, provided with apertures 10 and 11, one of which engages over the mouth of a passage 12, which constitutes the secondary exhaust passage, and the other of which, 10, registers over a passage 13, which constitutes the inlet passage for fuel. The central opening 14 through which the stem 6 passes is of somewhat larger bore than the diameter of the stem 6, and there is formed an annular chamber 15, concentric with the cylinder valve chamber. Into the bottom of this annular chamber 15 leans a conduit pipe 16, from a lubricator 17. Around a solid ring 18 which forms a part of the valve seat 9, and on that side of it which is next to the rotating valve 19, is a shallow groove forming an extension of the annular chamber 15, and furnishing a free communication to a grooved passage 20 on the underside of the rotating valve 19. The grooved passage 20 opens on that side which is next adjacent to the loose valve seat, extends close to, but not entirely to, the periphery of the valve 19, and vanishes at the point 21 just before reaching the periphery of the rotating valve. The rotating valve 19 is furnished with a single opening 22, which serves both for an inlet port and for an exhaust port, according to the position of the valve, with respect to the passages 12 and 13. A primary exhaust passage 23 leads from the cylinder 1 into the exhaust passage 12, leading from a point near the limit of the outstroke of the piston, so that a large portion of the exhausted gases are discharged through the passage 23 into the exhaust outlet 12, and the remaining parts are discharged through the passages 11 and 12, which are open for discharge when the port 22 registers with the passage 11.

I have found, experimentally, that when an oil cup 17 is so located with respect to the annular chamber 15 that it will fill the annular chamber 15 by hydrostatic pressure, and the rotation of the valve 19, is at the speed which the valve ordinarily attains, an which may be anywhere from one hundred revolutions to twenty-five hundred revolutions per minute, there is formed a support for the valve which counteracts the pressure of the explosion, and counteracts the pressure that occurs under the return stroke in producing the compression of the gases, and which will even force the valve disk from its seat against this pressure, especially forcing it against the pressure of compression, and that this forcing effect takes place, even though a spring 26 of considerable force be employed to hold the valve to its seat. The same results attend the use of a hanging valve 29 occupying a chamber which is in direct extension of the cylinder, and mounted on a stem 25, which is concentric to the main cylinder. Such a hanging valve is shown in Fig. 4, in which valve 29 is carried on stem 25 driven by an external wheel 30. The stem 25 and wheel 30 are adapted to have slight motion of the valve toward and from its seat to which it is normally held by spring 32. The engagement of the periphery of the valve with the side walls of the valve chamber should be a good machine fit, with clearance sufficient to prevent binding under the expansion due to the high heat produced in action. In this construction oil is introduced through conduit 33; the ignition plug 34 is located at one side.

41 indicates the feed conduit, 42 the exhaust conduit.

I have found, from experimental use, that the lifting effect is sufficient to prevent excessive wear and apparently to prevent any wear on that face of the rotating valve which lies next adjacent to the seat, and this lifting effect is accomplished with apparently entirely perfect packing between the rotating disk and the walls of the cylinder in which it rotates. I attribute the result to centrifugal action upon the film of oil fed into the chamber 15, though it may be partially, or perhaps entirely, due to centrifugal action on a film of air included between the valve and its seat. Whatever be the cause of the result, I have found, experimentally, that the valve disk requires no cutting, tooling or fitting, and that the packing is sufficient to prevent leakage of gases during compression, even though both the valve disk and the removable seat be left in the condition they are when tooled in a lathe, and no grinding is required to fit either the disk or the cylinder, and the faces of the removable disk 9. This valve is especially useful in engines of the vertical type, that is, in which the piston reciprocates on a vertical line, and in engines of the two cycle type, in which the stem 6 is given a rotation of the same speed as the driving shaft or of the main shaft of the engine.

What I claim is:—

1. In an internal combustion engine having a compression chamber, a valve seat provided with a port, a rotary valve provided with a passage adapted to register with the said port, means for introducing a packing fluid to one face of the said valve at a central point with respect thereto, and an annular opening surrounding said valve in free communication with the compression chamber of said engine, substantially described.

2. In an internal combustion engine in combination with the compression chamber thereof, a valve chamber opening out of said compression chamber, rotary valve located in said valve chamber adapted for movement longitudinal of its axis means for admitting a packing fluid to a face of said rotary valve whereby the rotary movement of said valve causes the packing fluid to gather under the rim and thereby produces movement of said valve along its axis against the compression action of said engine, substantially described.

3. In an internal combustion engine, a compression chamber, a rotary valve having one face exposed to said compression chamber and one face engaging against a seat, means for introducing a packing fluid between the seat and the face of the valve, means on the valve disk adapted to produce centrifugal movement of said packing fluid.

4. In an internal combustion engine, in combination with a rotary valve, provided with means for producing centrifugal action of a fluid conducted to a face thereof, a spring arranged to hold said valve yieldingly to its seat, and a conductor adapted to lead a fluid to a central part of the face of said valve, substantially as described.

In testimony whereof, I sign this specification in the presence of two witnesses.

ROBERT A. REYNOLDS.

Witnesses:
C. F. BURTON,
W. M. SWAN.